UNITED STATES PATENT OFFICE.

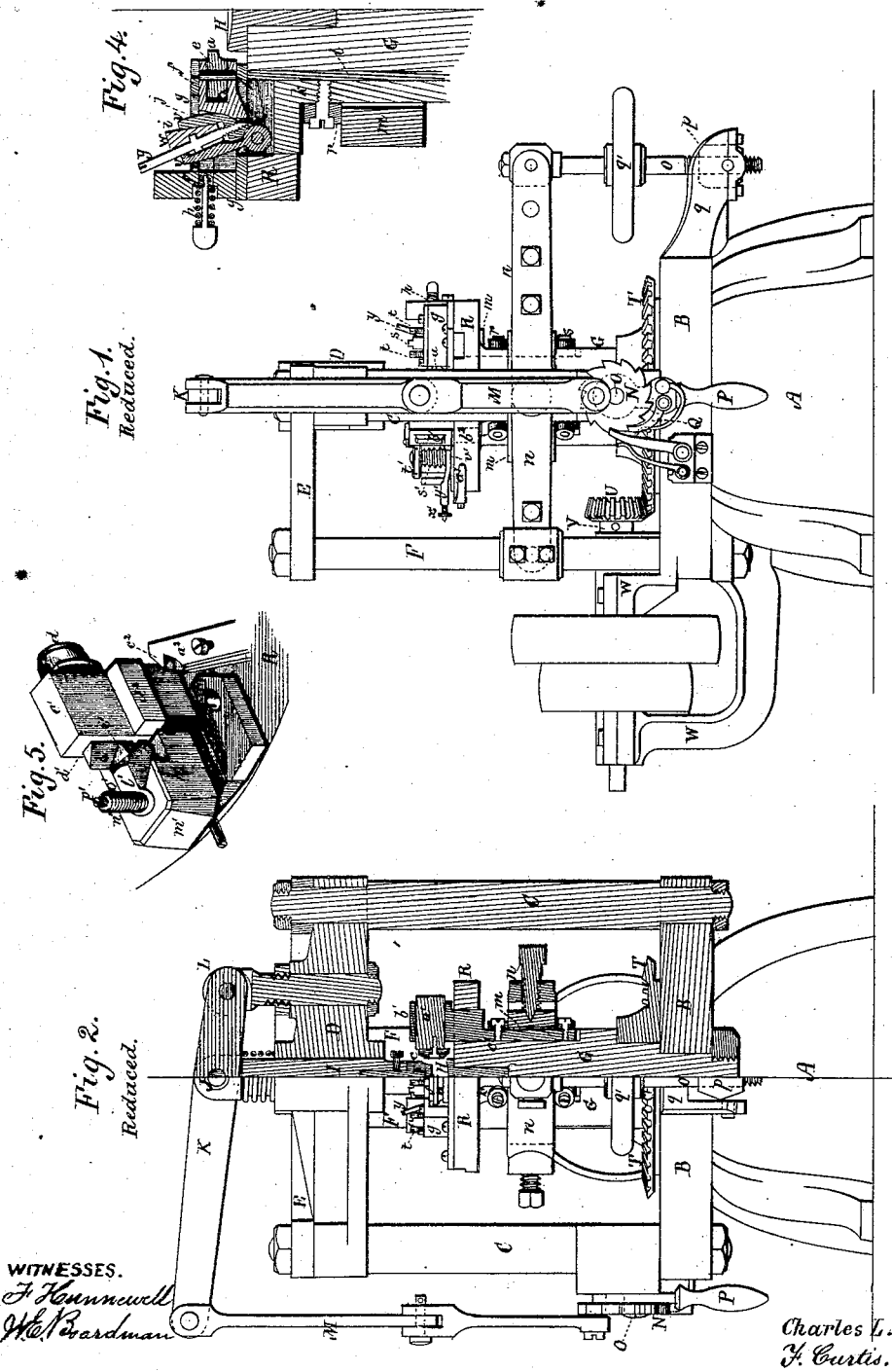

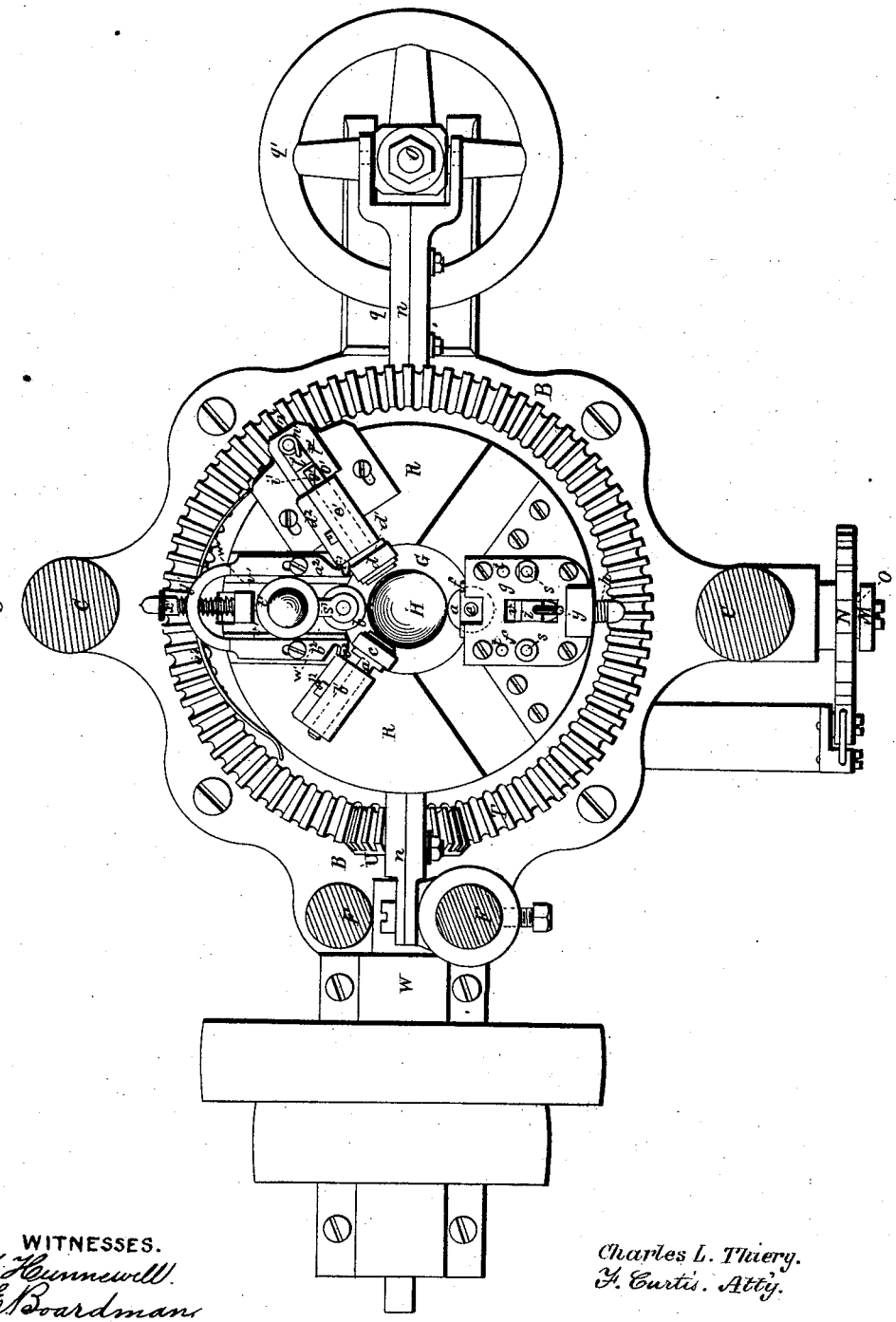

CHARLES LOUIS THIERY, OF BOSTON, MASSACHUSETTS.

IMPROVEMENT IN MACHINES FOR THE MANUFACTURE OF WATCH-CASES.

Specification forming part of Letters Patent No. 162,321, dated April 20, 1875; application filed March 25, 1875.

*To all whom it may concern:*

Be it known that I, CHARLES L. THIERY, of Boston, Suffolk county, Massachusetts, have invented certain Improvements in Machinery for Manufacturing Watch-Cases and kindred articles, of which the following is a specification:

Various patents of the United States have been issued or assigned to me relating to the manufacture of watch-cases, prominent among which are those numbered 54,136 and 54,137, and issued on the 24th day of April, 1866, to Charles H. Field, of Providence, Rhode Island, for the manufacture of watch-cases from a single piece or planchet of metal; those numbered 106,561, and issued to Thomas B. Dill, of Boston, Massachusetts, on the 23d day of August, 1870, for certain machinery for manufacturing watch-cases; and those numbered 96,632, and issued to myself on the 9th day of November, 1870, for watch-cases made of single pieces of metal without joints or seams; and also those numbered 98,896, and issued to myself on the 18th day of January, 1870, for producing various detailed parts of a watch-case, and in which I show a system of thickening certain portions of a case at points where it is desirable to obtain greater strength.

In the practical working of these patents in my business as an extensive manufacturer, many important modifications and additions thereto have manifested themselves, and it is to these additions or improvements, especially upon the Dill machine, that my present invention relates.

This invention consists, in the main, of automatically feeding forward the swaging or shaping rolls of the machine, in lieu of advancing or feeding them by hand, as heretofore practiced; but the invention also embraces various details of mechanism, all of which will be duly explained.

In common with the Dill patent, my present machine contains a mold or former for receiving and imparting to the metal planchet the general form it is to assume when completed, and, in combination with such mold, a plunger or male die for forcing the metal planchet into the mold, and constituting, with such mold, a clamp or vise for securely holding the planchet, while its outer portion or edge which projects beyond the plunger is being swaged into the destined shape; while, in combination with such mold and die, the machine embodies a series of rollers, pivoted to suitable carriers or supports, and traveling about the mold, one or more such rollers revolving upon horizontal pivots, and the others upon vertical pivots; the first-named rollers and their carriers being susceptible of bodily vertical movements toward or away from the top of the mold, and being intended to crowd a portion of the metal planchet or blank into the irregularities or cavities of the mold, or to condense, upset, or otherwise reduce a portion of such blank to the desired form; while the functions of the latter rollers are to prevent bulging, crushing, or breaking down of the wall of the blank, which the first-named rollers would otherwise cause.

The drawings accompanying this specification represent, in Figure 1, a side elevation; in Fig. 2, a cross-sectional elevation; in Fig. 3, a plan; and in Figs. 4 and 5, sections of details of the machine to be hereinafter explained.

In these drawings, A represents the pedestal or base of the machine as composed of a hollow block or post, while upon this base I erect the frame of the machine, consisting of a tablet, B, two side columns, C C, surmounted by a cross head or beam, D, and a curved brace, E, the rear of the latter being supported by two columns or posts, F F, also erected upon the tablet B.

The operative parts of the machine are mounted upon or rotate in common with an upright shaft, G, erected centrally upon the base B, and midway between the columns C C; and upon or within the upper end of this shaft G, I place the matrix or former H, which receives the planchet of metal to be manipulated.

The matrix or mold H is fashioned interiorly into the form desired, and therefore imparts to the planchet of metal, which is crowded into it, the general shape which such planchet is to assume, whether the object to which the planchet is reduced be a body of a cover or the removable or waste portion of "center," &c., and the planchet is forced into the irregularities or sinuosities of the mold by a drop-die or plunger, I, which, as shown in the drawings, is attached to the lower end of a cylindrical rod or bar passing centrally and vertically upward through the cross-beam D, and suspended at its upper end, by a pivot, J, from a horizontal lever, K, which lever is disposed over the said cross-beam D, and finds its base in an adjustable step, L, erected upon such cross-head.

As the plunger, after descending upon the planchet, and crowding the latter into the mold, constitutes, in conjunction with the latter, a clamp to seize and securely hold the greater portion of said planchet while its outer portion or periphery is being manipulated, it becomes necessary, in order to secure an economical operation of the machine, to provide a means of raising and lowering this plunger with a rapid and powerful movement; and to effect such a result, in doing which I carry out one feature of my present improvements, I connect the outer or free end of the lever K to the upper end of a jointed or flexible pitman, M, the lower end of such pitman being in turn pivoted to the outer side, eccentrically, of a ratchet-wheel, N, which ratchet-wheel is provided with a stop-pawl or dog, and is mounted and revolves upon a horizontal stud, O, projecting laterally from the lower part or base of the left column C, before alluded to; while mounted also upon the stud O, and disposed between the latter and said column, is a hand-lever, P, which carries a spring-pawl, Q, to engage the teeth of the ratchet-wheel, and operate the latter after the manner of ratchet-drills now in general use, and as will be readily understood. The eccentric or crank action of the wheel N upon the pitman M effects the elevation and depression of the lever K and plunger I, and it will be seen that the operator can, by a long sweep of the hand-lever P, effect at one movement either the elevation or depression of the plunger, although in practice several movements are usually made.

The lever K, jointed pitman M, ratchet-wheel N, and hand-lever P, with its pawl Q, constitute a means I have adopted for effecting one object aimed at in these improvements— that is, as before stated, of obtaining rapid and powerful movements of the plunger or male die.

The rotary carriage, which supports and carries the reducing or shaping rollers, which manipulate the planchet into the form which the latter is to assume, irrespective of or in addition to that imparted by the mold and plunger, is shown in the accompanying drawings at R as a horizontal disk or face-plate, which constitutes the upper termination of central shaft G, before named, while to the lower part of this shaft G, and immediately above the tablet B, I affix a horizontal bevel-gear, T, which engages and is driven by an upright beveled pinion, U, affixed to the inner end of a horizontal shaft, V, which constitutes the driving-shaft of the machine, and is mounted within a branch standard, W, departing from the rear side of the base A, the pinion serving to impart continuous rotary motion to the carriage R.

As a second and important element in my present improvements consists in the manner in which I automatically effect the feeding movements of the swaging-rollers, or the carriers upon which they are mounted, I shall now describe the peculiarities of the mechanism by which I effect such results.

As shown in the accompanying drawings the swaging-rollers are four in number, although this number may be varied at pleasure, two of which—viz., $a$ and $b$—are horizontal rollers, and serve to produce, as well as to protect, the lips or walls of the cover of the case or other object to be reduced to shape in the machine, while the other pair of rollers—viz., $c$ and $d$—are to act downward upon the upper edge of said wall, and condense, thicken, upset, or otherwise treat the planchet or blank of metal according to the nature of the article to be produced.

It is important in the manufacture of watch-cases that at certain points in the cover, as well as other parts, the metal should be thicker than at others, to obtain strength when needed, and effect an economical use of metal, and this effect is one valuable result obtained by the Dill machine, as stated in the Letters Patent before named, as issued to Dill, and owned by myself. This increasing of the thickness of the metal at certain points where most necessary is also shown in the patent before named as issued to me on the 18th day of January, 1870; and the past two years of my experience has taught me the importance of this result, for which my present machine is especially valuable.

The roller $a$, whose purpose, in the main, is to aid in producing the centers of watch-cases, is mounted upon a vertical shaft or pin, $e$, within the furcated inner end of a horizontal sliding bar or carriage, $f$, which, in turn, is received and slides within a hollow guide or box, $g$, affixed to the upper face of the carriage R, the roller $a$ being situated immediately adjacent to the periphery of the plunger, and serving, as before stated, to keep the wall of the metal planchet, after the latter has been reduced to a box-shape, in an erect position and against the plunger, and protect such wall from the crushing and crippling which would result to it by the action of the condensing or shaping rollers $c\,d$.

The bar or carriage $f$ is retracted by a spring, $h$, as shown in the drawings, and is advanced against the power of this spring and toward the plunger by a vertical wedge, $i$, which wedge enters a slot, $j$, created in such bar $f$, and is pivoted at its lower end to the upper extremity of a vertical slide bar or carrier, $k$, which is let into, and plays within, a longitudinal channel, $l$, created in the periphery of the tubular shaft C, the vertical movements of this slide-bar $k$ being effected by an annular band or ring, $m$, which encompasses the shaft C, and is gimbaled within a horizontal beam, $n$, such beam being pivoted adjustably, at its rear end, to one of the posts F before alluded to, and having its front end swiveled in a suitable manner to the upper end of a vertical feed or adjusting-screw, $o$, the lower end of such screw being screwed into a nut, $p$, swiveled to an arm, $q$, constituting part of the front of the base A of the machine.

The connection between the slide-bar $k$ and ring $m$ consists in a pair of anti-friction rollers, $r$ $s$, which are pivoted to the bar, and roll upon the said ring, one above and one below, and it will be apparent that, as the feed-screw is rotated in one direction, the beam $n$, and consequently the wedge $i$, are elevated; and as such wedge recedes from the front boundary of the slot $j$ the bar $f$ also recedes with it by the action of the spring $h$, and the roller $a$ recedes from the immediate vicinity of the plunger, or the wall of the blank of metal surrounding the latter.

The box or guide $g$ is secured to the carriage R by bolts $s$, and its height with respect to such carriage is governed by set-screws $t$ $t$, &c., while, furthermore, the wedge $i$ is rendered expansible, to vary its scope, by constructing it in two parts, $v$ $v$, hinged together at bottom, and by introducing between these parts an auxiliary wedge or expanding block or spreader, $w$, the height of this spreader, and, consequently, the breadth of the wedge, being determined by a rod, $y$, which screws through the lower part of the wedge proper, and is connected or swiveled in any suitable manner to the spreader. The condensing or upsetting roller $c$ is pivoted to the inner end of a horizontal carrier-bar, $a^1$, which slides within the upper part of a vertically-sliding post, $b^1$, which post or bar, like the bar $k$, is let into and plays within a channel, $c^1$, created longitudinally in the periphery of the tubular shaft C, and like said bar $k$ is connected with and operated by the ring $m$ through the medium of anti-friction rollers. The second swaging or upsetting roller, $d$, is also pivoted to the inner end of a horizontal bar, $d^1$, which slides within the upper part of a vertical post or bar, $e'$, which bar slides within a channel, $f'$, created in the shaft C, and is pivoted with anti-friction rollers to operate with the ring $m$ in manner similar to the operation of the bar $f'$, and this roller $d$ is intended for use in connection with blanks, whose walls are higher and thinner than those operated upon by the roller $c$. A peculiar motion is imparted to the carrier-bar $d^1$ within the bar $e'$, and with respect to the mold H, as follows: The rear end of this bar is reduced to two sloping or oblique faces, $g'$ and $h'$, the upper one, $g'$, of which is a lateral slope, and the other, $h'$, a longitudinal slope or under cut, as shown in Fig. 5 of the drawings, while the ledge or step $i'$, which intervenes between these wiping faces, is also sloping downward, as represented in said Fig. 5. The bar $d^1$ is forced outwardly or away from the locality of the mold H by a spring, and abuts at its outer end against the sloping inner end $p'$ of a swinging dog or cam, $l'$, composed of a short block pivoted at its outer end to the top of a post, $m'$, which is erected upon the carriage R, this dog being forced, by a spring, against a stop, $o'$, placed alongside it. As the bar $d^1$, in company with the bar $e'$, is lowered during the production of any given portion of a watch-case, its under cut or lowest slope or inclined face $h'$ comes in contact with the sloping end $p'$ of the dog $l'$, and as the bar $d^1$ continues to descend, the bar is, by the wiping action of such dog, forced outward, thus impelling or feeding the roller $d$ gradually inward toward the mold and plunger, as the cover or other portion of a case is being fashioned into shape. The bar $d^1$ continues to descend until it reaches its lowest point, and the slope $h'$ passes below the dog, when the laterally-sloping portion $g'$ of the said bar crowds the dog to one side, and forces itself outward between such dog and the stop $o'$, and retracts the bar $d^1$, and removes the roller from contact with the object which has been compressed into the desired shape. The screw $o$, by means of its hand-wheel $q'$, is now rotated in a reverse direction until the bar $d^1$ and its roller are raised to their highest point, which permits of the removal of the finished portion of a case, and the introduction of a second planchet, and it will be seen that as the said bar $d^1$ rises in this return movement, its sloping step $i'$ wipes against the under side of the dog $l'$, and forces the latter to one side, and prevents it from obstructing the ascent of the bar.

The second horizontal protector-roller $b$ is disposed between the rollers $c$ and $d$, and is pivoted to the inner end of a bar, $s'$, which is secured in a proper manner to the upper part of a post, $t'$, such post being erected upon a horizontal plate, $v'$, sliding to and fro of a radial groove or channel, $w'$, created in the top of a carriage, R, and forced outward by a suitable spring, $a^3$, the said bar $s'$ abutting at its outer extremity against a stop-screw, $x'$, which is screwed through the outer end or bend of a horizontal yoke, $y'$, disposed upon the top of the carriage R, and with its arms $a^2$ $b^2$ straddling the post $t'$, the yoke being confined to the carriage by any suitable connection which permits it to reciprocate to a limited extent. In order to automatically force the roller $b$ inward as the work progresses, as in the case of its companion roller $a$, I form upon the inner end of each arm $a^2$ $b^2$ of the yoke $y'$ a sloping step, $c^2$, and to each carrier-bar $a^1$ and $e'$ I add a rib or tooth, $d^2$, so disposed that when each bar is lowered by and with the beam $n$ these ledges shall intercept the step $c^2$, and force the yoke $y'$, and with it the post $t'$ and roller $b$, inward. As the rollers $c$ and $d$ and their carrier-bars rise the roller $b$ is retracted by the action of the spring $a^3$.

In the use heretofore of machinery for producing watch-cases under the system shown in the Dill patent the advance or feeding movements of the rollers as the work progresses have been effected by the hand of the operator, acting through the medium of a screw, or its equivalent, thereby monopolizing the operator's time, and compelling his undivided attention to this act.

By my method, in which the machine while pursuing its other functions automatically effects this feeding of the rollers, the attendant is enabled to devote a great part of his time to other labor, thereby securing a point of economy of time, and obtaining more accurate and perfect results.

The operation of this machine briefly stated is as follows: The circular planchet of metal destined to form the desired portion of a watch-case, is first cut from a sheet and then struck up in a suitable press into a "blacking-box" shape, so called. The "blank" thus acquired is deposited bottom downward within the mold or matrix H, and the plunger I lowered by means of the hand-lever P and ratchet N until it meets the blank and clamps the latter to mold, and in the act forcing or crowding the bottom of the blank into the irregularities or sinuosities of the mold. The driving-pinion U is next put in revolution, which imparts rotary motion to the carriage R, one of the rollers $a$ or $b$ having been previously advanced until, as it travels in a circle about the plunger, it nearly or quite impinges against the outer face of the wall of the blank, and serves to keep such wall up to the periphery of the plunger, and prevent its becoming crushed or misplaced by the action of the rollers $c$ and $d$.

The revolution of the carriage R causes the various rollers to travel in a common circular path about the mold and plunger, the vertical rollers bearing down upon the upper edge of the wall of the blank, and the horizontal rollers serving, as before stated, to protect and support the sides of such wall; consequently, if the attendant, by means of the feed-screw $o$, gradually lowers the beam $n$ the rollers follow the movement until the lowest point is reached, and the blank has been reduced to the general shape intended, the rollers $a$ and $b$, or one of them, being in the act gradually fed inward automatically, as before explained.

As stated in the Dill patent, so in the present machine, the amount of metal in the blank is to be so calculated as to provide for increasing the thickness of the desired portion of a watch-case in some places, as compared with others, as by the system of rotary swages or reducing-rollers, I am enabled, in either machine, to increase or diminish the thickness of the blank at any desired point.

I claim—

1. The means, substantially as herein described, whereby, with the descent of the series of rollers about the mold and plunger, in the act of reducing the blank to shape, one or all rollers shall be automatically advanced or fed inward toward the axis of the plunger, essentially in manner and for the purposes stated.

2. The mechanical details herein shown for effecting the advance or feeding of the horizontal rollers $a\ b$, the same consisting of the horizontal annular ledge or ring $m$, the beam $n$, and feed-screw $o$, actuating the bars $k$, &c., which support the roller-carriers, substantially as and for purposes stated.

3. The mechanism herein shown for elevating and depressing the plunger or male die I, the same consisting of the lever K, jointed or flexible pitman M, ratchet-wheel N, and hand-lever P, substantially as and for purposes stated.

4. The combination of the tilting beam $n$ and annular bearing or ring $m$ with the roller-bars in such manner that as the beam departs from a horizontal plane in one or the other direction, in the act of raising and lowering the rollers, the ledge or ring $m$ shall preserve a horizontal position, and constitute a roadway for the anti-friction rollers $r\ s$, &c., to travel upon or against, substantially as and for purposes stated.

5. The combination of the sliding bar $f$ playing in suitable guides and carrying the roller $a$, and the variable or expansible wedge $i$, the latter being connected at its lower end to the slide-bar $k$, which bar, in turn, is connected with the annular band $m$, and the whole operating substantially as and for purposes stated.

6. The means herein shown of advancing or feeding the swaging-roller $d$, the same consisting of the bar $d^1$ sliding in the bar $e'$, and with its inclined faces or steps $g'\ h'\ i'$, and the dog or cam $l'$, pivoted to a suitable support or abutment, and the whole carried by the carriage R, and operating substantially as and for purposes stated.

7. The means herein shown of advancing or feeding the roller $b$, the same consisting of the bar $s'$, carrying such roller, and secured to the plate $v'$ by the post $t'$, and the yoke $y'$, with its sloping steps or grades $c^2$, actuated by the ribs $d^2$, the whole being substantially as and for the purposes stated.

CHARLES LOUIS THIERY.

Witnesses:
 FRED. CURTIS,
 W. E. BOARDMAN.